United States Patent
Clauss et al.

(10) Patent No.: US 7,555,882 B2
(45) Date of Patent: Jul. 7, 2009

(54) DRIVE FOR A CROP PICKING HEAD

(75) Inventors: Steffen Clauss, Rieschweiler-Mühlbach (DE); Stefan Bohrer, St. Wendel (DE); Rainer Schäfer, Zweibrücken (DE); Jürgen Hofer, Großbundenbach (DE); Peter Pirro, Wallhaben (DE)

(73) Assignee: Deere & Company, Moline, IL (US)

( * ) Notice: Subject to any disclaimer, the term of this patent is extended or adjusted under 35 U.S.C. 154(b) by 471 days.

(21) Appl. No.: 11/156,680

(22) Filed: Jun. 20, 2005

(65) Prior Publication Data

US 2005/0279073 A1 Dec. 22, 2005

(30) Foreign Application Priority Data

Jun. 21, 2004 (DE) .................. 10 2004 029 953

(51) Int. Cl.
*A01D 41/127* (2006.01)

(52) U.S. Cl. ............... 56/10.2 G; 56/10.2 R; 56/10.2 H

(58) Field of Classification Search ......... 56/10.6–10.8, 56/11.1, 11.4, 13.5–13.9, 14.1–14.3, 14.5, 56/119, 192, 344, 364, 372, 503, DIG. 21, 56/10.2 R, 10.2 G, 10.2 H See application file for complete search history.

(56) References Cited

U.S. PATENT DOCUMENTS

| | | | | |
|---|---|---|---|---|
| 3,885,375 | A * | 5/1975 | Solterbeck | 56/15.6 |
| 3,945,175 | A | 3/1976 | Barkstrom et al. | |
| 4,967,863 | A * | 11/1990 | Teijido et al. | 180/53.1 |
| 5,901,535 | A * | 5/1999 | Duckinghaus et al. | 56/10.2 G |
| 6,298,643 | B1 * | 10/2001 | Wuebbels et al. | 56/60 |
| 6,587,771 | B2 | 7/2003 | Panoushek et al. | |
| 6,666,007 | B2 | 12/2003 | Schroeder | |
| 6,895,734 | B2 * | 5/2005 | Ameye | 56/10.8 |
| 7,189,160 | B2 * | 3/2007 | Pirro | 460/7 |
| 7,219,487 | B2 * | 5/2007 | Ameye | 56/10.2 H |

FOREIGN PATENT DOCUMENTS

| | | |
|---|---|---|
| DE | 41 11 981 | 4/1991 |
| DE | 195 27 607 | 7/1995 |
| DE | 195 31 918 | 8/1995 |

(Continued)

OTHER PUBLICATIONS

German Search Report, Aug. 27, 2007, 3 Pages.

*Primary Examiner*—Thomas B Will
*Assistant Examiner*—Mai T Nguyen

(57) ABSTRACT

The agricultural harvesting machine having a crop picking head includes a pickup conveyer which can be driven so as to pick up the harvested crop at a first adjustable speed, a discharge conveyer which can be driven so as to receive the harvested crop picked up by the pickup conveyer, transport the harvested crop, and discharge the harvested crop at a second adjustable speed, and a feed-in conveyer disposed in a feed-in channel of the harvesting machine that can be driven so as to receive the harvested crop from the discharge conveyer, transport the harvested crop, and discharge the harvested crop to a harvested crop processing unit at a third adjustable speed. The third speed and the first speed are independent of one another, and the second speed is defined by the first and third speeds and falls in a range between the first and third speeds.

8 Claims, 6 Drawing Sheets

FOREIGN PATENT DOCUMENTS

| | | |
|---|---|---|
| DE | 196 32 977 | 8/1996 |
| DE | 196 06 388 | 8/1997 |
| DE | 198 12 500 | 3/1998 |
| DE | 199 18 550 | 4/1999 |
| DE | 101 54 874 | 5/2003 |
| DE | 103 60 597 | 7/2005 |
| EP | 0 099 527 | 7/1983 |
| EP | 0 928 554 | 7/1999 |
| EP | 1 396 184 | 3/2004 |
| WO | WO 02/56672 | 1/2002 |

* cited by examiner

DRIVE FOR A CROP PICKING HEAD

BACKGROUND

1. Field of the Invention

The subject matter of the present invention generally relates to an agricultural harvesting machine with a crop picking head.

2. Related Technology

During harvest operations, agricultural harvesting machines of the present type are moved across a field to pick up or harvest plants by means of a crop picking head, transport them into the harvesting machine where the crop is processed, and finally transfer the processed plants or parts separated therefrom to a transport vehicle. As a rule, the crop picking head generally comprises one or more pickup conveyers which serve to pick up the plants from the soil. For example, prongs of a pickup attachment which pick up hay that has been mown in a previous operation and is ready to be picked up in a swath, or to separate the plants from the roots that remain in the soil and feed them into the crop picking head, such as the mowing and feeding-in drums of a corn picker head. A discharge conveyer receives the plants from the pickup conveyers and transfers them to a feed-in conveyer in the feed-in channel of the harvesting machine. Often, the discharge conveyers used are cross conveyer screws which additionally move the plants in the transverse direction relative to the center of the crop picking head. In other crop picking heads, the pickup conveyers are also responsible for the transverse movement which takes place on the front ends or rear ends in interaction with separate cross conveyer elements. So called cross conveyer drums can be used as pickup conveyers in the known crop picking heads.

The feed-in conveyer in the feed-in channel of the harvesting machine subsequently transports the plants to a harvested crop processing device of the harvesting machine, for example, a chopper drum, a threshing drum, or a threshing and separating rotor.

In a field chopper with a chopper drum, the speed of the feed-in conveyer (pre-press rolls) at a given rotating speed of the chopper drum determines the cutting length. To change the cutting length, the usual practice is to change the rotating speed of the feed-in conveyer of the field chopper, which can be implemented by change-over gears or adjustable, purely hydraulic drives or by a combination of mechanical and hydraulic drives. In such cases, the rotating speed of the chopper drum remains approximately constant so that the cutting length is inversely proportional to the rotating speed and speed of the pre-press rolls.

In some regions, a trend toward longer cutting lengths is presently observed. The longer cutting lengths require a relatively high speed of the feed-in conveyers of the field chopper. To avoid transport problems due to the difference in speeds during the transfer of the plants from the discharge conveyers of the machine to the feed-in conveyer of the field chopper, it is possible to drive all driven elements of the crop picking head at a higher rotating speed as well. For this purpose, multistage change-over gears are used. It has also been proposed that the crop picking head be driven at a speed proportional to the rotating speed of the feed-in conveyers. The disadvantage of varying the speeds of all driven elements of the crop picking head is that the rotating speeds of the pickup conveyers are increased as well, although such an increase does not improve the harvested crop transport and thus would not actually be necessary. It increases the drive power requirement, and, for example, in the case of a corn picker head with rotating mowing and feed-in drums, it leads to an increased rate of wear of the cutting knives and braking mechanisms of the crop picking head. Because of the higher rotating speeds which lead to higher centrifugal forces, corn cobs may be separated from the plants as well and thus be lost to the harvesting process.

WO 02/056672 A describes a harvesting machine with a crop picking head in which the discharge conveyers (i.e., the cross conveyer screw and the inclined conveyer drums) are driven at a speed which is independent of the speed of the pickup conveyers (pickup forks or mowing and feed-in assemblies). This is implemented in that the feed-in conveyer and the discharge conveyer together are driven by a first hydraulic motor while the pickup conveyer of the crop picking head is driven by a second hydraulic motor. The speed of the pickup conveyer depends on the forward speed of the harvesting machine.

This setup ensures that the speed of the discharge conveyer is firmly coupled to the speed of the feed-in conveyer so that at this point transfer problems are no longer to be expected. The speed of the pickup conveyer can be freely chosen and thus be adapted to the prevailing conditions. However, when the differences between the speeds of the two conveyers are too great, problems may arise during the transfer of the harvested crop from the pickup conveyer to the discharge conveyer. If, for example, at high forward speeds and long cutting lengths, the pickup conveyer moves considerably faster than the discharge conveyer, jams may occur at the receiving end in the area of the discharge conveyer. If, at low forward speeds and short cutting lengths, the pickup conveyer moves considerably more slowly than the discharge conveyer, the latter may tear up the harvested crop, which leads to non-uniform cutting lengths.

Another disadvantage of the setup described in WO 02/056672 A is that two mechanical drive connections must be disposed between the crop picking head and the harvesting machine. These drive connections must be attached and detached whenever the crop picking head is attached and detached. To overcome this problem, it has been proposed that a changeable speed-transforming gear unit be disposed between the pickup conveyer and the discharge conveyer. In this case, the change of speed of the feed-in conveyer is not automatically adjusted, instead, this adjustment of the speed transformation of the gear unit is made by the operator.

SUMMARY OF THE INVENTION

The present invention provides a harvesting machine and crop picking head combination that is improved compared to prior-art combinations of this type and that allows an adjustment of the speed of the discharge conveyer relative to the speed of the pickup element of the crop picking head.

In one embodiment, the aperture includes a pickup conveyer for the crop picking head which can be driven to pick up the harvested crop at a first adjustable speed, a discharge conveyer for the crop picking head which can be driven to receive the harvested crop that has been picked up by the pickup conveyer and convey it at a second adjustable speed, and a feed-in conveyer disposed in a feed-in channel of the harvesting machine, wherein the feed-in conveyer can be driven to receive the harvested crop from the discharge conveyer and convey it at a third adjustable speed to a harvested crop processing unit, with the third speed not being dependent on the first speed.

The first speed at which the pickup conveyer picks up the harvested crop and the third speed at which the feed-in conveyer transports the harvested crop are independent of each other. The third speed can be chosen depending on a desired cutting length, while the first speed can be freely chosen and can be adjusted to the prevailing conditions. It is proposed that the second speed at which the discharge conveyer of the crop picking head transports the harvested crop be automatically controlled as a function of the first speed and the third speed. The second speed is in a range between the first and the third speed, preferable halfway in between. In this manner, no transfer problems are expected to arise either on the receiving or on the discharging end.

The first speed can depend on an operating condition of the harvesting machine, such as its forward speed or the throughput capacity or the throughput of the crop picking head or of the feed-in conveyer of the harvested crop processing unit of the harvesting machine. The first speed preferably varies within specific limits as a function of the forward speed. When a crop picking head in the form of a pickup attachment is used, such as the pickup conveyer that has a rotating pickup roller with prongs for collecting cut grass, hay or straw from the field and, as a discharge conveyer, has a cross conveyer screw, a minimum speed of the pickup roller should always be maintained, even on standstill, so as to allow the roller to pickup the harvested crop that was deposited in front of the crop picking head after a reversing maneuver. This maneuver may be necessary to clear the crop picking head after a foreign object, e.g., an iron object, has been detected or after a jam at the feed-in conveyer end. The operator may find it useful to select the speed of the pickup conveyer independently of the prevailing forward speed of the harvesting machine, e.g., when short grass is picked up. In such a case, the forward speed can be relatively high so as to ensure a high throughput while the speed of the pickup conveyer is relatively low so as to ensure a better raking action on the harvested crop on the field. When corn picker heads are used which cut and pick corn in fields planted by broadcast methods and which comprise mowing and feed-in assemblies that rotate about the vertical axis, the rotating speed of the mowing and feed-in assemblies that serve as the pickup conveyer may be independent of or increase only slightly with the forward speed.

In the combination according to the present invention, any type of crop picking heads can be used. As previously mentioned, it is possible to use corn harvesting machines with pickup conveyers in the form of mowing and feed-in drums. These harvesting machines are constructed of a cutting disk that rotates about an approximately vertical axis and a coaxial conveyer drum disposed above the cutting disk. The conveyer drum has recesses distributed across its circumferential area so as to be able to pick up corn stalks, and the discharge conveyer of the harvesting machines is a cross conveyer screw or an inclined conveyer drum which rotates about an approximately vertical axis. It is also possible to use pickup attachments with prong conveyers as the pickup conveyer and cross conveyer screws as the discharge conveyer, cutting units with reels as the pickup conveyer and cross conveyer screws or conveyer belts as cross conveyers, or corn pickers with picking units as the pickup conveyer and cross conveyer screws as the discharge conveyer.

The harvesting machine can be a field chopper with a chopping drum as the harvested crop processing unit, wherein the speed of the feed-in conveyer determines the cutting length. The invention can also be used as a harvested crop processing unit on a combine harvester with a threshing drum or a threshing and separating rotor.

To drive the pickup conveyer and/or the discharge conveyer of the crop picking head, a purely hydraulic drive may be used for the crop picking head. The hydraulic motors can be disposed on the harvesting machine and drive the pickup conveyer and the discharge conveyer via detachable mechanical drive connections, or they may be attached directly to the crop picking head, which would mean that the latter would have to be fitted only with hydraulic, but not with mechanical, drive connections. A mixed form with a hydraulic motor on the crop picking head and one on the harvesting machine is also conceivable. In that case, the pickup conveyer and the discharge conveyer would be driven solely by hydraulic motors which operate flexibly and make it possible to easily adjust the rotating speeds, but have a limited efficiency. Alternatively, it would also be possible to use a mechanical drive for the pickup conveyer and/or discharge conveyer in which the changeable rotating speeds are implemented by belt variators.

Preferably, one planetary gear unit each is used as the drive for the pickup conveyer and the discharge conveyer. To change the rotating speed, one element (sun wheel, planetary wheel carrier or ring wheel) of the planetary gear unit is driven via an externally powered motor (i.e., electrically or hydraulically) while one element is mechanically driven and one serves as an output gear. This motor can also be used for reversing.

The planetary gear unit for a conveyer that requires higher propulsive output (generally the pickup conveyer) is preferably disposed on the harvesting machine and connected at the output end of the associated (pickup) conveyer via a purely mechanical drive train. The planetary gear unit of the other conveyer may then also be attached to the harvesting machine and be connected to the associated conveyer, generally the discharge conveyer, via a second purely mechanical drive chain, which requires that two drives be connected and disconnected. Alternatively, the planetary gear unit of the other conveyer is disposed on the crop picking head. In this case, its mechanical input is subsequently collected by the mechanical drive train of the pickup conveyer. A rotating speed that is dependent on the third speed can then be mechanically provided by the feed-in conveyer.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DESCRIPTION OF THE EMBODIMENTS

Figure 1:
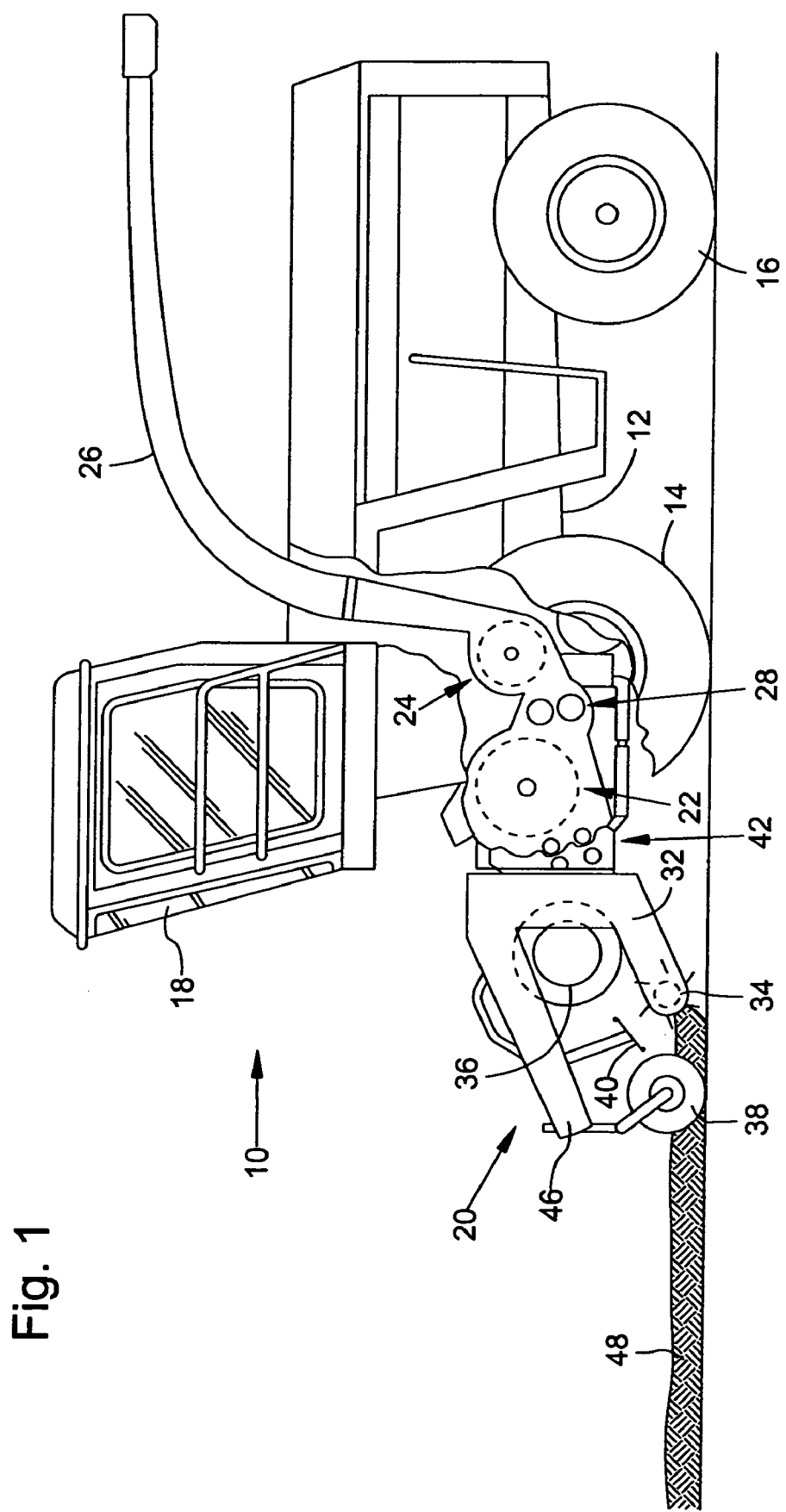
FIG. 1 is a side view of a harvesting machine with a crop picking head in the form of a pickup attachment.

Referring to the Figures, FIG. 1, shows a harvesting machine 10 in the form of a self-driving field chopper. The harvesting machine 10 comprises a frame 12 which is supported by driven front wheels 14 and steerable rear wheels 16. The harvesting machine 10 is operated from an operator's cabin 18 from which a crop picking head 20 can be seen. The harvested crop, e.g., grass or another crop, that has been picked up off the ground by the crop picking head 20 is fed via a feed-in conveyer 42 with feed rollers that are disposed within a feed-in housing. The feed-in housing is positioned on the front end of the field chopper 10 and feeds the harvested crop to a harvested crop processing unit 22 in the form of a chopper drum which chops the harvested crop into small pieces and transports it to a conveyer 24. The harvested crop leaves the harvesting machine 10 via a tiltable discharge chute 26, which can rotate about an approximately vertical axis, and is discharged into a trailer that runs parallel to the harvesting machine. A secondary chopping unit 28 extends between the harvested crop processing unit 22 and conveyer 24. The harvested crop is fed tangentially through the secondary chopping unit 28 to the conveyer 24.

In this particular practical example, the crop picking head 20 is designed as a so-called pickup attachment. The crop picking head 20 includes a frame 32 and is supported off the ground by supporting wheels 38 which are attached on both sides and mounted via one support 46 each on a frame 32. The crop picking head 20 serves to pick up the harvested crop lying as a swath 48 on the ground of a field and feed it to the harvesting machine 10 for further processing. During the harvesting operation, the crop picking head 20 is moved across the field at a short distance from the ground while it is lifted for transport on a street or on roads.

The crop picking head 20 includes a discharge conveyer 36 in the form of a conveyer screw which transports the received harvested crop from the sides of the crop picking head 20 to a centrally located discharge opening (not shown). A feed-in conveyor 42 is positioned downstream of the discharge opening. Like the discharge conveyer 36, the crop picking head 20 includes a rotary driven pickup conveyer 34 which is disposed underneath the discharge conveyer 36 and lifts the harvested crop up off the ground with conveyer prongs and transfers the harvested crop to the discharge conveyer 36. Also attached to the frame 32 is a holding-down device 40 in the form of a metal sheet that is disposed above the pickup conveyer 34.

Figure 2:
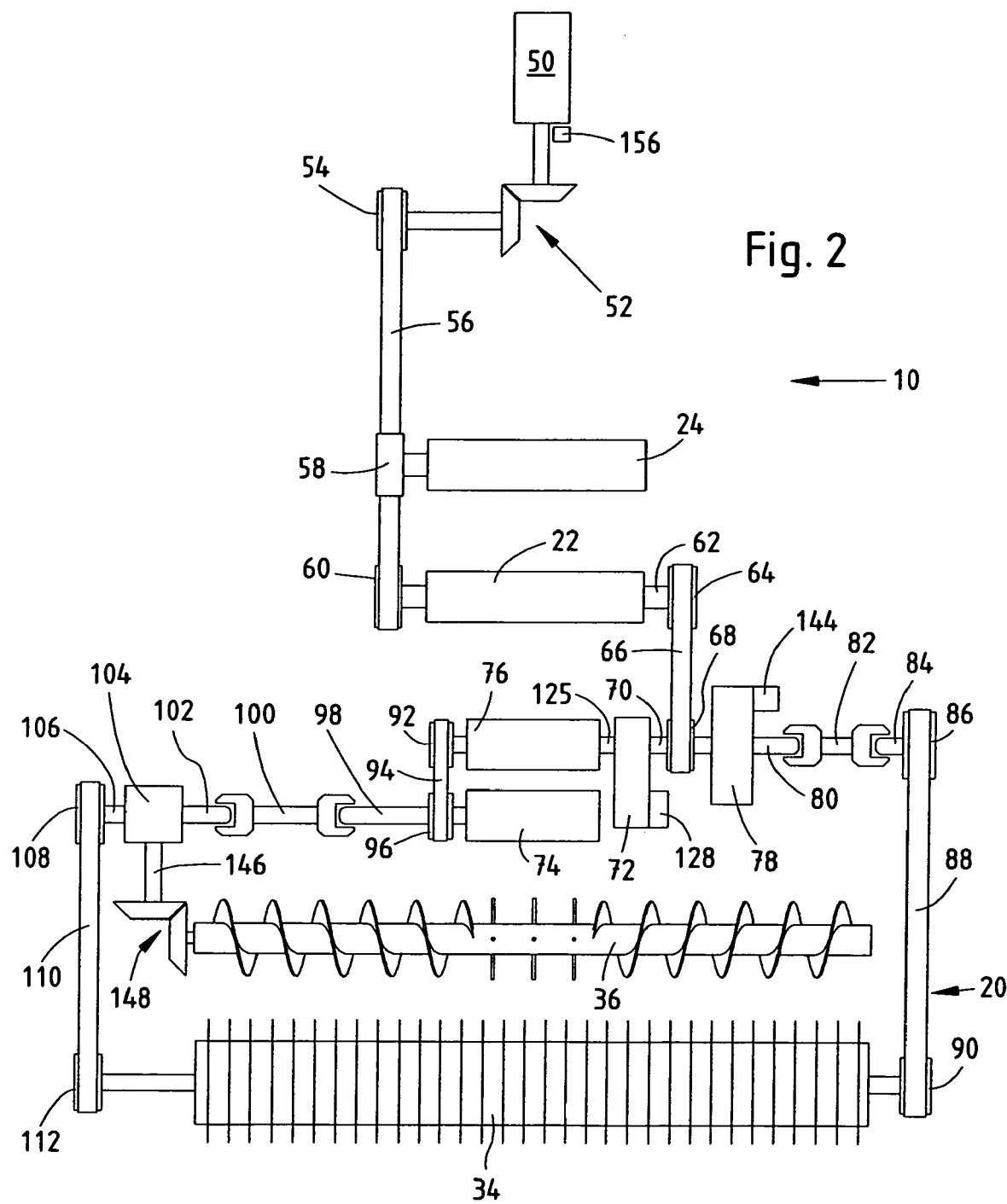
FIG. 2 is a schematic view of the drive system of the harvesting machine and the crop picking head.

FIG. 2 shows the drive chain of the harvesting machine 10 and crop picking head 20. An internal combustion engine 50 is mounted on the frame 12 of the harvesting machine 10 and drives a bevel gear 52 and belt pulley 54. A belt 56 is driven by the belt pulley 54, and in turn, drives a second belt pulley 58 that drives the conveyer 24. The belt 56 further drives a belt pulley 60 which drives the harvested crop processing unit 22. The harvested crop processing unit 22 in turn drives a shaft 62 which drives a pinion 64. Via a chain 66, the pinion 64 is in drive connection with a pinion 68 which drives the input shaft 70 of a cutting length gear unit 72. Alternatively, a drive connection with gear wheels is disposed between the harvested crop processing unit 22 and the cutting length gear unit 72.

The cutting length gear unit 72 comprises drive elements for driving lower pre-press rolls 74, 76 and upper pre-press rolls (not shown in FIG. 2, but see FIG. 1) of the feed-in conveyer 42. The rotating speed of the pre-press rolls 74, 76 can be changed in steps or continuously by the cutting length gear unit 72. The cutting length gear unit 72 is shown in greater detail in FIG. 3.

The input shaft 70 also drives a pickup conveyer gear unit 78. The pickup conveyer gear unit 78 is connected on the discharge end to a stub shaft 80 to which a first cardan shaft 82 with a fixed or variable length is detachably connected. The cardan shaft 82 extends from the stub shaft 80 of the pickup conveyer gear unit 78 to a stub shaft 84 on the crop picking head 20. The stub shaft 84 drives a pinion 86 which, via a chain 88, is in drive connection with a pinion 90 that drives the pickup conveyer 34.

The upper pre-press rolls 74, 76 are in drive connection with each other via three gear wheels 92, 94, 96. The shaft of the lower front pre-press roll 74 is connected to a stub shaft 98 on which a second cardan shaft 100 with a fixed or variable length is detachably connected. The second Cardan shaft 100 extends from the stub shaft 98 to a stub shaft 102 on the crop picking head 20. This stub shaft 102 extends into a discharge conveyer gear unit 104 that has a second input shaft 106 having a pinion 108 mounted thereon. This pinion 108 is in drive connection with pinion 112 via a chain 110, such that the discharge conveyer gear unit 104 is drivingly connected to the pickup conveyer 34. An output shaft 146 of the discharge conveyer gear unit 104 drives the discharge conveyer 36 via a bevel gear drive 148.

Figure 3:
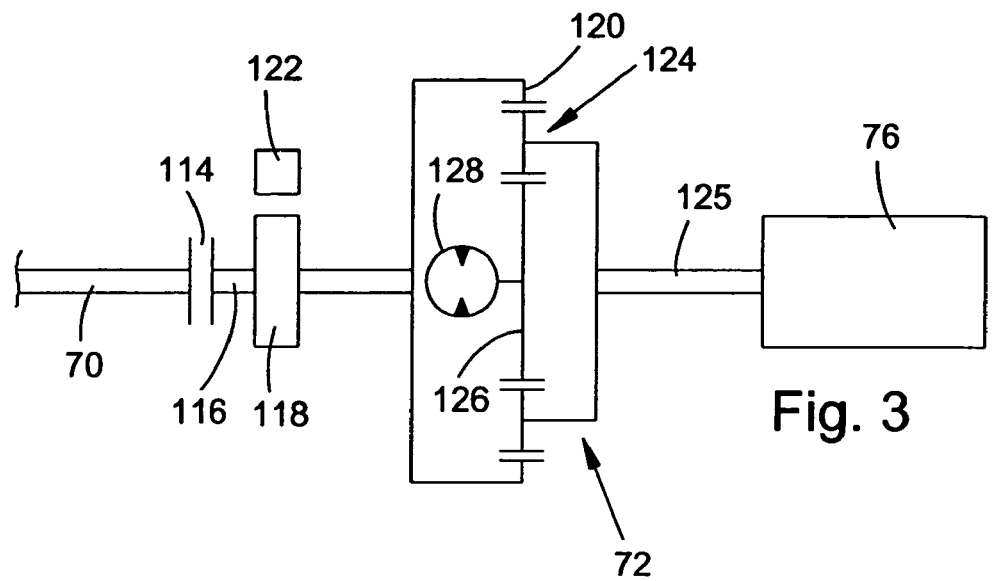
FIG. 3 is a schematic view of the cutting length gear unit for driving the feed-in conveyer of the harvesting machine.

Referring to FIG. 3, the cutting length gear unit 72 is shown in greater detail. The shaft 70 is connected to a coupling 114 which, on the output side, drives a shaft 116. The shaft 116 carries a pinion 118 and drives a ring wheel 120 of a planetary gear unit. A dog spring 122 can be made to engage the pinion 118 to rotationally lock the shaft 116. Instead of the combination of pinion 118 and dog spring 122, a friction brake could also be used. A planetary wheel carrier 124 of the planetary gear unit drives a shaft 125 that is connected to and drives the pre-press roll 76. A sun wheel 126 of the planetary drive unit can be driven by a hydraulic motor 128.

Figure 4:
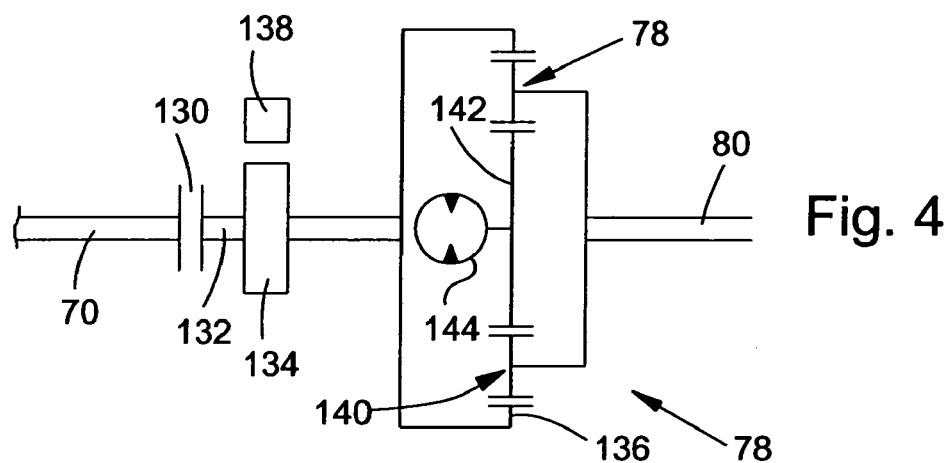
FIG. 4 is a schematic view of the pickup conveyer gear unit.

The construction of the pickup conveyer gear unit 78 shown in FIG. 4 is similar to that of the cutting length gear unit 72. The shaft 70 is connected to a coupling 130 which, on the output side, drives a shaft 132 which carries a pinion 134. The shaft 132 drives the ring wheel 136 of a second planetary gear unit. A dog spring 138 can be made to engage the pinion 134 to rotationally lock the shaft 132. Instead of the combination of pinion 134 and dog spring 138, a friction brake could also be used. A planetary wheel carrier 140 of the second planetary gear unit drives a shaft 80, and a sun wheel 142 of the planetary gear unit can be driven by a hydraulic motor 144.

Figure 5:
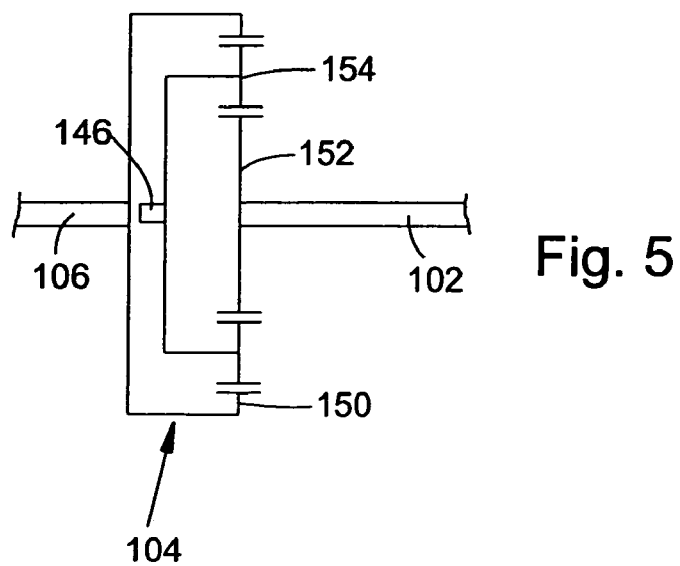
FIG. 5 is a schematic view diagram of the discharge conveyer gear unit.

FIG. 5 shows the discharge conveyer gear unit 104 in greater detail. The shaft 106 is in drive connection with ring wheel 150 of a third planetary gear unit while the shaft 102 drives the sun wheel 152, and the planetary wheel carrier 154 drives the shaft 146.

The hydraulic motors 128, 144 include adjustable swash plates and can be actuated by a pump 156 which is driven by the internal combustion engine 50. The positions of the swash plates of the hydraulic motors 128, 144 and thus their rotating speeds can be varied by the operator in the operator's cabin 18 or are automatically preset by an electronic control.

During normal harvesting operations, couplings 114 and 130 are closed and dog springs 122 and 138 do not engage the pinions 118 and 134. The internal combustion engine 50 which is driven at an approximately constant rotating speed that can be varied by the operator in the operator's cabin 18 thus drives the ring wheel 120 of the first planetary gear unit in the cutting length gear unit 72. By changing the rotating speed of hydraulic motor 128, the rotating speed of the shaft 125 and thus the speed of the pre-press rolls 74, 76 of the feed-in conveyer 42 can be varied. Since the speed of the harvested crop processing unit 22 remains constant, the cutting length can be set by changing the rotating speed of the hydraulic motor 128. In this case, most of the power is transferred mechanically while hydraulic motor 128 only serves to finely adjust the cutting length. The cutting length (i.e., the rotating speed of hydraulic motor 128) can be adjusted by the operator in the operator's cabin 18 via an input device. It may also be possible to automatically set the cutting length on the basis, for example, of a humidity measurement or other properties of the harvested crop that are detected with a sensor.

The internal combustion engine 50 also drives the ring wheel 136 of the second planetary gear unit in the pickup conveyer gear unit 78. The speed of the pickup conveyer 34 can be changed by changing the rotating speed of the hydraulic motor 144. In this case, most of the power is transferred mechanically while the hydraulic motor 144 only serves to finely adjust the speed of the pickup conveyer 34. The speed of pickup conveyer 34 (i.e., the rotating speed of hydraulic motor 144) can be adjusted by the operator in the operator's cabin 18 via an input device. It may also be possible to automatically set the speed which, for example, may be dependent on the type of crop picking head 20 used and the given forward speed. Using the pickup attachment shown, pickup conveyer 34, for example, runs at a certain speed even at standstill. The speed of the pickup conveyor 34 increases linearly as the forward speed increases.

The discharge conveyer 36 is driven by the pickup conveyer gear unit 104 at a speed which depends on the speed of feed-in conveyer 42 and the speed of the pickup conveyer 34. During normal harvesting operations, the sun wheel 152 of the third planetary gear unit rotates in the direction opposite to that of the ring wheel 150. The speed of the planetary wheel carrier 154 and thus of shaft 146 that drives the discharge conveyer 36, therefore increases as the rotating speed of feed-in conveyer 42 increases and as the rotating speed of the pickup conveyer 34 increases. The discharge conveyer gear unit 104 and the other elements in the drive train of the discharge conveyer 36 are dimensioned to ensure that the speed of discharge conveyer 36, i.e., the speed at which the discharge conveyer transfers the harvested crop to the feed-in conveyer 42, is in the range between the speeds at which the feed-in conveyer 42 and the pickup conveyer 34 transport the harvested crop. The speed of the discharge conveyer 36 is preferably at least approximately halfway between these speeds. This ensures that the discharge conveyer 36 does not encounter transporting problems either on the pickup end or on the discharge end.

If a harvested crop jam or an alert emitted by the metal detector in the feed-in channel of the harvesting machine 10 makes it necessary to reverse the combine, the power from the internal combustion engine 50 to the cutting length gear unit 72 and to the pickup conveyer gear unit 78 is cut off, which can be implemented by means of the externally powered couplings 114 and 130 (for example, when the metal detector has triggered an alert after having detected a foreign material or when the operator or a suitable sensor has detected a harvested crop jam). Shortly thereafter, the metal detector would also stop shaft 125. In addition, an electric coupling in the belt pulley 54 would preferably also be switched off so as to bring the harvested crop processing unit 22 and the conveyer 24 to a stop.

To reverse the combine, the dog springs 122 and 138 are then made to engage pinions 118 and 134. The hydraulic motors 128 and 144 are made to rotate in the direction opposite to that used during the harvesting operation and subsequently reverse the feed-in conveyer 42 and the pickup conveyer 34. Via the discharge conveyer gear unit 104, the discharge conveyer 36 is also reversed. After elimination of the harvested crop jam or the foreign material, hydraulic motors 128 and 144 can also serve to slowly feed in the harvested crop. Since two hydraulic motors 128, 144 are available, it is also possible to first reverse the pickup conveyer 34 by reversing hydraulic motor 144. This also causes the discharge conveyer 36 to rotate, though relatively slowly, and the harvested crop is ejected by the discharge conveyer 36 and the pickup conveyer 34. Subsequently, the feed-in conveyer 42 is reversed by reversing the hydraulic motor 128, which causes the discharge conveyer 36 to rotate faster. Since the discharge conveyer 36 and the pickup conveyer 34 no longer contain any harvested crop, it is now possible to easily resolve the harvested crop jam in the feed-in conveyer 42.

Figure 6:
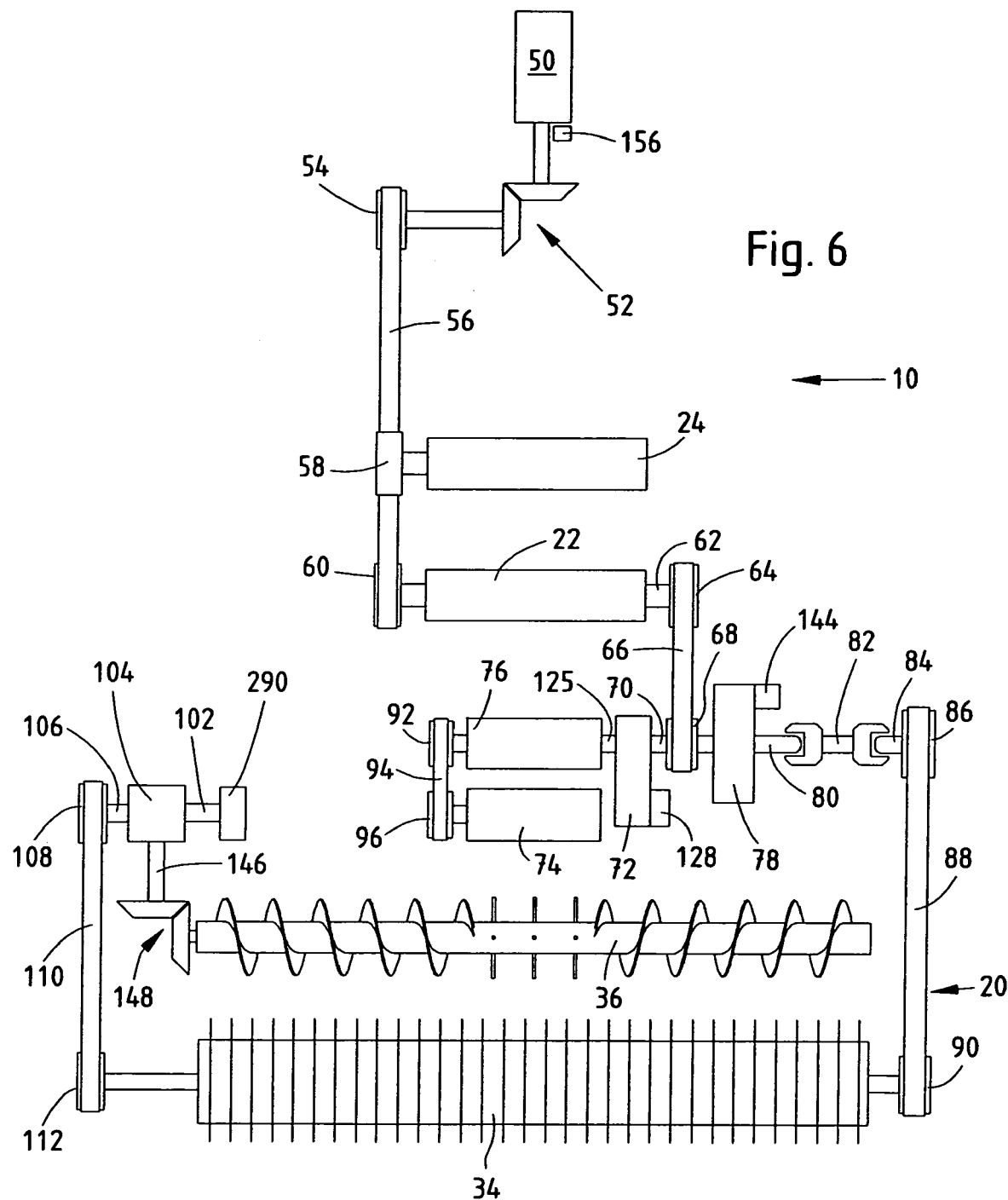
FIG. 6 is a schematic view of an alternative embodiment of the drive system of the harvesting machine and of the crop picking head shown in FIG. 1.

The drive train of an alternate embodiment is shown in FIG. 6. Elements corresponding to those previously discussed of the embodiment shown in FIGS. 2-5 are designated by the same reference numerals. Most of the elements are identical to those of the previous embodiment, thus requiring that only the differences be explained below.

Referring to FIG. 6, contrary to the drive train shown in FIG. 2, a shaft 102 for driving sun wheel 152 of the third planetary gear unit in the discharge conveyer gear unit 104 is driven by a separate hydraulic motor 290. This makes it possible for the second speed at which the discharge conveyer 36 transports the harvested crop to be set or controlled with a greater degree of freedom. The relationship between the third speed of the feed-in conveyer 42 and the second speed is no longer mechanically preset but can be defined in any way desired by a suitable control mechanism. The hydraulic motor 290 also serves to reverse the discharge conveyer 36 and, after a harvested crop jam or a detected foreign body has been eliminated, to slowly feed in the harvested crop.

Figure 7:
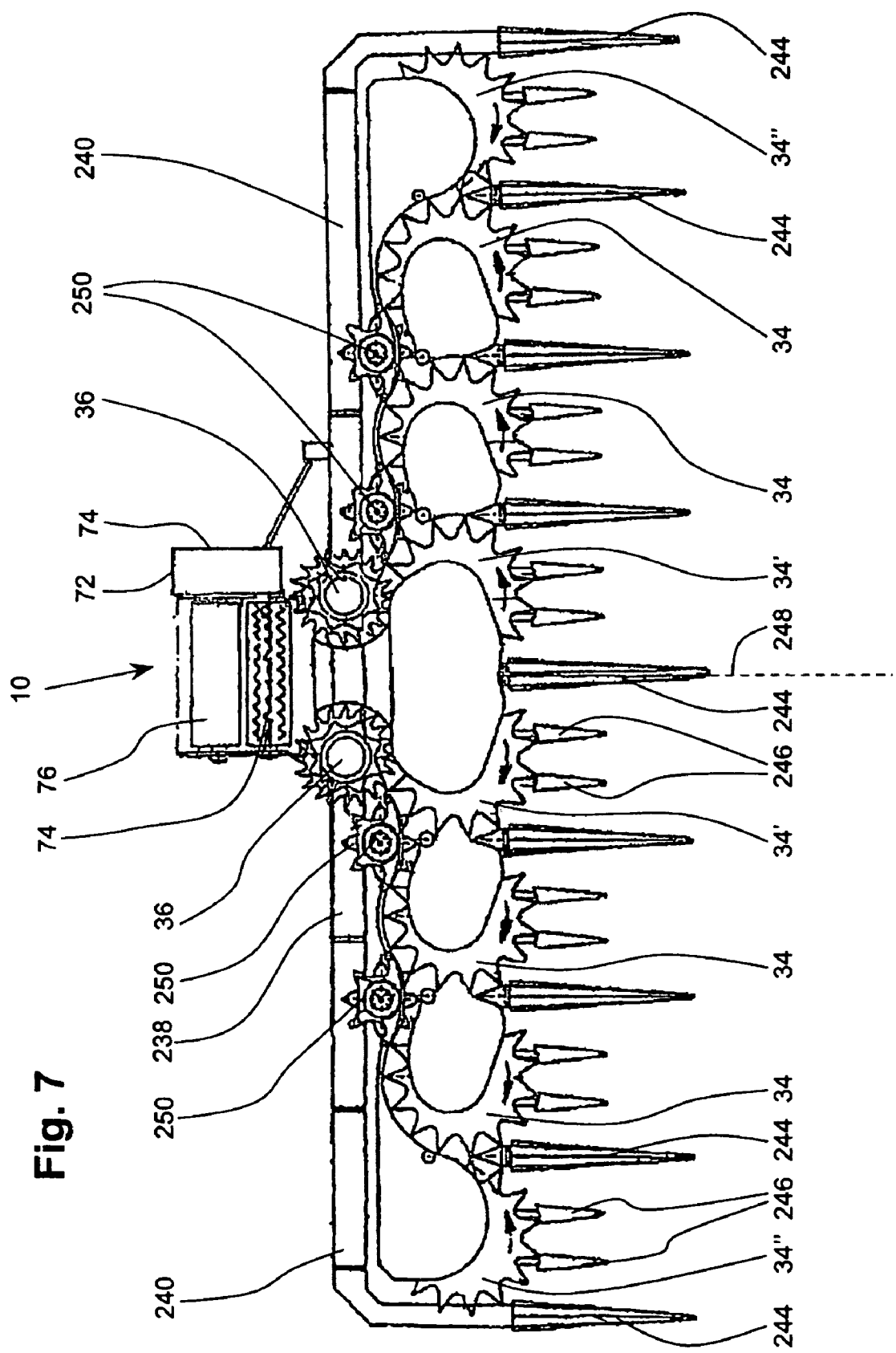
FIG. 7 is a top view of the feed-in housing of the harvesting machine with a crop picking head in the form of a corn picker head.

FIG. 7 shows a top view of the feed-in housing of yet another embodiment of the harvesting machine 10, wherein the housing pre-press rolls 74, 76 are disposed, with an attached crop picking head 20' in the form of a corn picker head. The crop picking head 20' has a cross carrier which is comprised of a centrally located segment 238 that is connected to the feed-in channel of the field chopper 10 and two upwardly swivel-able outer segments 240 which run through hydraulic cylinders parallel to the forward direction V so as to allow transport on a road. Supported side by side on the cross carrier are eight pickup conveyers 34 in the form of mowing and feed-in structures. But any other number of pickup conveyers 34 can be used as well. Pickup conveyers 34 have lower cutting disks and conveyer disks supported above, with recesses for picking up plant stalks uniformly distributed across their circumferential area. Disposed upstream of these recesses are larger stalk dividers 244 and, in between these, smaller stalk dividers 246.

Cross conveyor drums 250 are disposed on the rear side of the wedge-shaped areas between the neighboring pickup conveyers 34. However, no drums 250 are present between the two pickup conveyers 34' adjacent to the central longitudinal plane 248 and the area between outer pickup conveyers 34" and those adjacent to the outer pickup conveyers. The outer pickup conveyers 34" rotate in the direction opposite to that of the three inwardly following pickup conveyers 34, thus obviating the need for cross conveyer drums 250 downstream of the outer pickup conveyers 34". Discharge conveyers 36 in the form of so-called inclined conveyer drums are disposed on the rear sides of the pickup conveyers 34' adjacent to the central longitudinal plane 248. The discharge converyers 36 have approximately vertical, but slightly forwardly inclined axes of rotation which serve to compensate for the difference in height between the bottom of the crop picking head 20' and the feed-in housing of harvesting machine 10.

During the harvesting operation, the pickup conveyers 34 rotate in the directions indicated by the arrows. By means of their cutting disks, they separate the crop to be harvested from the soil and pick it up in the recesses of their conveyer disks.

On the rear sides of the conveyer disks, the harvested crop is subsequently transported by cross conveyer drums 250 in cooperation with the rear sides of the pickup conveyers 34 in the direction of the central longitudinal plane 248 of the crop picking head 20'. The harvested crop is subsequently received by the discharge conveyers 36 which first transport the harvested crop in the direction toward the central longitudinal plane 248 and subsequently rearward and upward into the feed-in housing of the harvesting machine 10.

Figure 8:
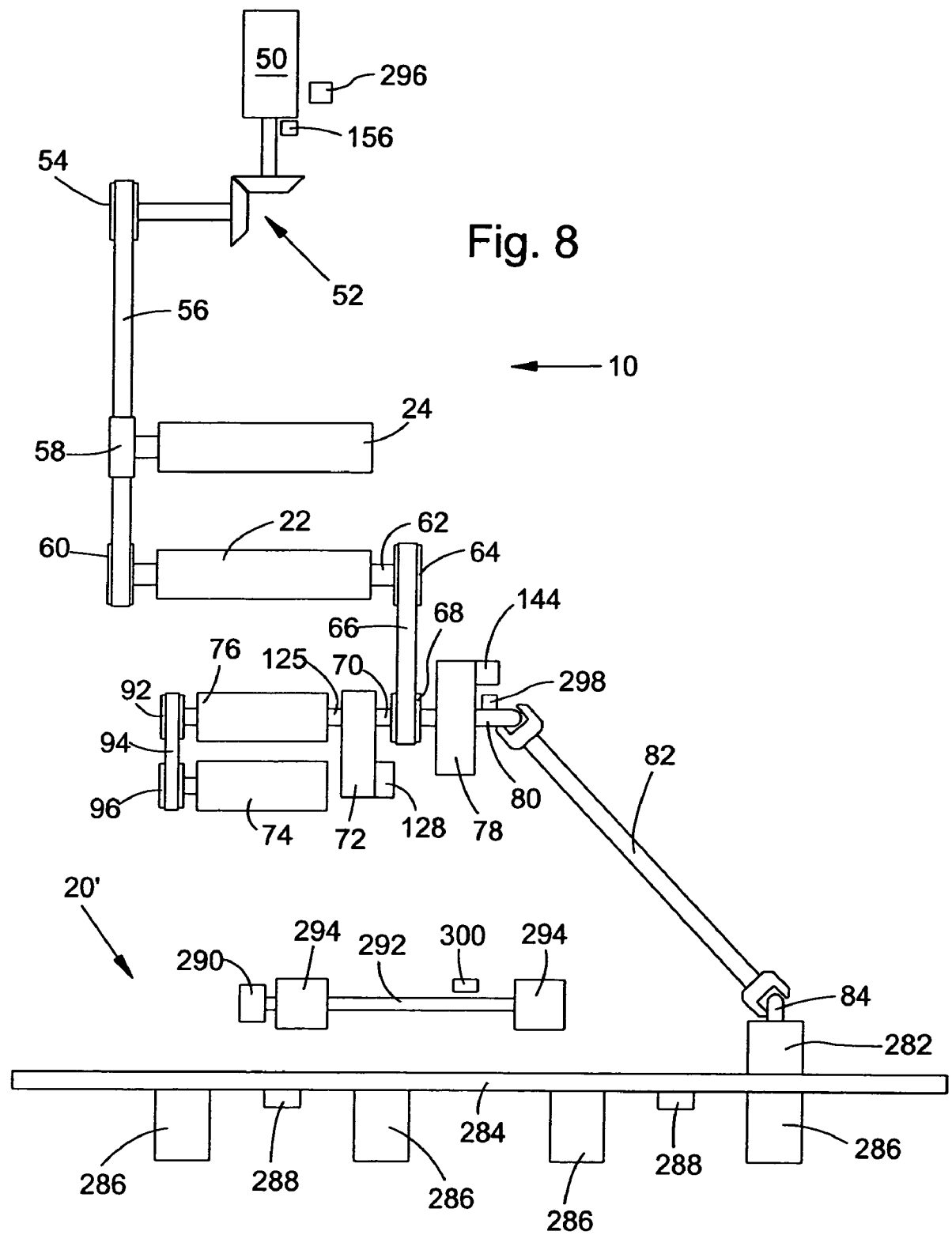
FIG. 8 is a schematic view of the drive system of the harvesting machine and of the crop picking head shown in FIG. 7.

FIG. 8 shows the drive chain of the harvesting machine 10 and of the crop picking head 20'. Elements corresponding to the previous embodiment shown in FIGS. 2-5 are designated by the same reference numerals. The drive of feed-in conveyer 42 with the pre-press rolls 74, 76 via the cutting length gear unit 72 and the cardan shaft 82 via the pickup conveyer gear unit 78 is identical to that described in the previous embodiment. Thus, only variations from the previous embodiment will be explained below.

Cardan shaft 82 extends from the stub shaft 80 of the pickup conveyer 78 to stub shaft 84 of an input gear 282 of the crop picking head 20'. Via gear wheels and/or chains (not shown in the drawing), the input gear 282 is in driving connection with a cross shaft 284 which is disposed within segments 238, 240 of the cross carrier and which extends substantially across the entire width of the crop picking head 20'. In the transition region toward the swing-up segments 240, suitable couplings (not shown in the drawing) are disposed in the cross shaft 284. Via bevel gears (not shown in the drawing) or similar means, the cross shaft 284 drives eight gears 286, each of which is associated with a pickup conveyer 34. Via four additional small gears 288, the cross shaft 284 is in drive connection with cross conveyer drums 250.

In addition, the crop picking head 20' includes a third hydraulic motor 290 which drives a shaft 292 and which is connected to a pump 156 by means of detachable hydraulic hoses. Shaft 292 drives two gears 294 which in turn drive the discharge conveyers 36.

The cutting length gear unit 72 makes it possible to change the conveying speed of feed-in conveyer 42 within a certain cutting length range. The rotating speed of the pickup conveyer 34 and the cross conveyer drums 250 which are driven via the pickup conveyer gear unit 78 is not dependent on the speed of the feed-in conveyer 42. The rotating speed of the hydraulic motor 144 is selected to ensure that the stalk-like crop to be harvested, in particular corn, is cleanly cut off and that the harvested crop is transported to the discharge conveyers 36 free from obstructions. This rotating speed is sufficiently high even when harvesting machine 10 is at standstill so that the plants can be cleanly cut off, and by means of a control mechanism 296, can be slightly increased linearly with the forward speed of harvesting machine 10. A control mechanism 296 ensures that the speed of shaft 284 remains constant even if the internal combustion engine 50 rotates more slowly when the load is increased. Control mechanism 296 preferably has a sensor 298 to detect the rotating speed of stub shaft 80 or an element connected therewith via the drive so as to be able to not only set the rotating speed of the hydraulic motor 144 but also to control it. The relationship between the first and third speeds as input parameters and the second speed as an output parameter is stored in the control mechanism in the form of tables or functional relationships.

The control mechanism 296 also controls the rotating speed of the hydraulic motor 290 based on the rotating speed of feed-in conveyer 42 and pickup conveyers 34. It is selected to ensure that the conveying speed of the discharge conveyers 36 is approximately halfway between the conveying speed of the feed-in conveyer 42 and the pickup conveyer 34. The control mechanism preferably has a sensor 300 to detect the rotating speed of shaft 292 or of an element connected therewith via the drive so as to be able to not only set the rotating speed of the hydraulic motor 290 but also to control it. Control mechanism 296 may also preset or control the rotating speed of the feed-in conveyer 42, in particular as a function of the forward speed and the type and width of crop picking head 20, 20'.

During the reversing maneuver, hydraulic motors 128, 144 and 290 are driven in the direction opposite to that during the harvesting operation. The chronological sequence can be selected so that first, the pickup conveyers 34 are reversed by the hydraulic motor 144, and subsequently the discharge conveyers 36 are reversed by the hydraulic motor 290, and only after that, is the feed-in conveyer 42 reversed by the hydraulic motor 128. The conveyers set into motion prior thereto remain switched on, at least until the harvested crop jam or the foreign body has been eliminated.

In accordance with the provisions of the patent statutes, the present invention has been described in what is considered to represent its preferred embodiments. However, it should be noted that the invention can be practiced otherwise than as specifically illustrated and described.

What is claimed is:

1. An agricultural harvesting machine with a crop picking head comprising:
   a pickup conveyer that can be driven so as to pick up a harvested crop at a first adjustable speed;
   a discharge conveyer that can be driven so as to receive harvested crop from the pickup conveyer, transport and discharge the harvested crop at a second adjustable speed; and
   a feed in conveyer disposed in a feed in channel of the harvesting machine that can be driven so as to receive the harvested crop from the discharge conveyer, transport and discharge the harvested crop to a harvested crop processing unit at a third adjustable speed, wherein the third speed is independent of the first speed, and the second speed depends on the first and third speeds and lies between the first and third speeds.

2. The agricultural harvesting machine of claim 1 wherein the second speed is approximately halfway between the first and the third speed.

3. The agricultural harvesting machine of claim 1, wherein the first speed depends on the forward linear speed of the harvesting machine.

4. The agricultural harvesting machine of claim 1, wherein the crop picking head is a pickup attachment, the pickup conveyer is a prong conveyer, and the discharge conveyer is a cross conveyer screw.

5. The agricultural harvesting machine of claim 1, wherein at least one of the pickup conveyer and the discharge conveyer are driven by a planetary gear unit, wherein an element of the planetary gear unit is driven by an externally powered motor so as to provide at least one of the first and second speeds.

6. The agricultural harvesting machine of claim 5, wherein the pickup conveyor is driven by a planetary gear unit that is disposed on the harvesting machine and is connected to the pickup conveyor by a detachable mechanical drive connection.

7. The agricultural harvesting machine of claim 5, wherein the discharge conveyer is driven by a planetary gear unit that is disposed on the crop picking head and is driven by a drive chain of the pickup conveyer.

8. The agricultural harvesting machine of claim 5, wherein the pickup conveyer is driven by a planetary gear unit that is disposed on the harvesting machine and is connected to the pickup conveyer by a detachable mechanical drive connection and the discharge conveyor is driven by a planetary gear unit that is disposed on the crop picking head and is driven by a drive chain of the pickup conveyer.

* * * * *